United States Patent
Roberts et al.

(10) Patent No.: US 6,222,669 B1
(45) Date of Patent: Apr. 24, 2001

(54) OPTICAL PARTIAL REGENERATION OF SOLITONS

(75) Inventors: Kim B. Roberts, Nepean (CA); Ian Hardcastle, Harlow (GB)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 09/291,186

(22) Filed: Apr. 14, 1999

(51) Int. Cl.[7] ....................................................... H01S 3/00
(52) U.S. Cl. .......................... 359/337; 359/341; 359/339; 359/348
(58) Field of Search .................................. 359/124, 341, 359/337, 339, 348, 349

(56) References Cited

U.S. PATENT DOCUMENTS

| 5,434,692 | 7/1995 | Auffret et al. ........................ 359/158 |
| 6,097,524 | * 8/2000 | Doran et al. .......................... 359/179 |

FOREIGN PATENT DOCUMENTS

WO9627956  9/1996 (WO).

OTHER PUBLICATIONS

M. Jinno and T. Matsumoto, Optical Retiming Regenerator Using 1.5μm Wavelengths Multielectrode DFB LDs, Electronics Letters, Sep. 28, 1989, vol. 25, No. 20, pp. 1332 and 1333.

Bruce M. Nyman, S.G. Evangelides, Soliton WDM Transmission, AT&T Bell Laboratories, 3 pages.

R. L. Fork, Charles V. Shank, Member, IEEE, R. Yen, and C.A. Hirlimann, Femtosecond Optical Pulses, IEEE Journal of Quantum Electronics, vol. QE–19, No. 4, Apr. 1983, pp. 500–506.

D. Atkinson, et al, Increased Amplifier Spacing in a Soliton System With Quantum–Well Saturable Absorbers and Spectral Filtering, Optics Letters/vol. 19, No. 19/ Oct. 1, 1994, pp. 1514–1516.

* cited by examiner

Primary Examiner—Stephen C. Buczinski

(57) ABSTRACT

A partial optical regenerator for use in high bit-rate optical systems and useful in WDM applications employing soliton transmission. The regenerator essentially comprises a saturable optical element in a main optical path and a resonant optical circuit coupled to the element. A resonant pulse can be generated from an input data pulse in a number of ways. (A) an input data pulse may be coupled directly to the resonant optical circuit before entering the element; (B) the input data pulse may first saturate the element, resulting in the creation of a counter-propagating pulse; (C) the data pulse may pass through the element and be coupled to the resonant optical circuit upon exit. The resonant pulse travels around the resonant circuit and repeatedly returns to the saturable optical element after an integer multiple of the symbol duration or after an odd integer multiple of half the symbol duration. Successive saturation of the element causes the output data pulses to be better aligned with respect to the center of the symbol interval.

35 Claims, 4 Drawing Sheets

LOSS OF SATURABLE ABSORBER

ON-TIME PULSE

LATE PULSE

EARLY PULSE

OPTICAL PARTIAL REGENERATION OF SOLITONS

FIELD OF THE INVENTION

The present invention relates to high bit-rate optical transmission systems and, in particular, to an apparatus for correcting timing jitter in a stream of soliton pulses.

BACKGROUND OF THE INVENTION

In order to enable the transmission of optical signals at rates exceeding a few dozen gigabits per second (Gbps), much research has been done in the area of pulse shaping and materials fabrication. In particular, it has been found that traditional bandwidth limitations imposed by chromatic dispersion can be overcome by fabrication of the optical transmission medium such that the induced chromatic dispersion is a function of pulse amplitude. If, in addition, the pulse shape and amplitude are carefully chosen, then an original pulse will maintain the chosen shape and amplitude as it travels along the fiber. Such specially shaped pulses are known as solitons and can be transmitted at intervals as low as 10 picoseconds (ps) between pulses.

In an ideal soliton transmission system, each soliton is at the center of the corresponding symbol interval. Unfortunately, in a practical system, timing jitter influences the position of a soliton relative to the center of the symbol interval and an error occurs when the pulse is shifted too far off center. The timing jitter has three main sources: Gordon-Haus jitter due to the addition of optical noise from upstream optical amplifiers, soliton-soliton interaction from the symbol pattern and interaction between channels of different wavelengths sharing the same fiber in a wavelength division multiplexed (WDM) system. A discussion of timing jitter can be found in the summary paper "Soliton WDM Transmission" by Bruce M. Nyman and S. G. Evangelides, presented at the conference on optical fiber communication (OFC) in 1995 and incorporated by reference herein.

To overcome the error-inducing effects of timing jitter in practical systems, it is necessary to install very high bit-rate regeneration units every five hundred kilometres or less. Since full regeneration units are relatively expensive components, it would be desirable to increase the distance which could be travelled by solitons without requiring their full regeneration. One possible approach is to place partial regeneration units, which are considerably less expensive than full regeneration units, at various points along the optical path.

One known method of partially regenerating solitons is described in an article entitled "Optical Retiming Regenerator Using 1.5 um Wavelength Multielectrode DFB LDs" by M. Jinno and T. Matsumoto, which appeared in Vol. 25, No. 20 of the journal "Electronics Letters", published on Sep. 28th, 1989 and incorporated by reference herein. The approach disclosed therein is based on a self-pulsating circuit to extract an optical clock from an input signal; the input signal is then combined with the clock signal and injected into a bistable multi-electrode distributed feedback laser diode which then reproduces the original optical data, retimed using the extracted clock. While this method possesses some desirable features, it is limited to a frequency range below 200 MHz and it is not feasible to construct such a circuit to operate at frequencies that are higher by several orders of magnitude.

Another relevant technique involves the use of an electro-absorptive modulator with a recovered clock, as described in WIPO International Patent Application WO 96/27956, published Sep. 12th, 1996, which is incorporated by reference herein. While the clock recovery system disclosed therein provides re-centering of optical symbols in a desired manner, it is extremely difficult to implement the modulator and the clock recovery apparatus at bit rates on the order of 100 Gbps or more.

SUMMARY OF THE INVENTION

It is an object of the present invention to mitigate or obviate one or more disadvantages of the prior art.

The invention may be summarized according to a first broad aspect as a regenerator for correcting timing jitter of a stream of data pulses travelling along an optical path in a direction of interest. The regenerator comprises a saturable absorber connected in the optical path, for presenting a region of low loss to optical signals of an intensity higher than a threshold and absorbing optical signals of an amplitude lower than the threshold. The regenerator also comprises a resonant optical circuit coupled to the saturable absorber, for controlling the saturable absorber to provide a plurality of successive regions of low loss at a controllable resonant rate.

The data pulses may be soliton pulses. The resonant optical circuit may comprise an optical amplifier, an input fiber connected between the West port of the saturable absorber and the input of the amplifier and an output fiber connected between the input of the amplifier and the East port of the saturable absorber. There may also be couplers connected to the input and output fibers and to the main optical path, for coupling the data pulses into resonant pulses propagating in the resonant circuit.

According to a second broad aspect, the invention may be summarized as a method comprising the steps of providing the saturable absorber, controlling the saturable absorber to provide a plurality of successive regions of low loss at a controllable resonant rate, adjusting the resonant rate of said regions of low loss to a multiple of the rate of said pulses and passing the pulses through the saturable absorber for re0-timing and re-shaping.

The invention can be summarized according to a third broad aspect as a regenerator for regenerating an input optical signal defining data symbols occupying respective symbol intervals of a common duration. The regenerator comprises an input for receiving the input optical signal, an output for transmission of a regenerated optical signal, a main optical path connected between the input and output of the regenerator and a saturable optical element connected in the main optical path.

The regenerator also comprises a first coupler connected in the main optical path between the input of the regenerator and the saturable optical element and a second coupler connected in the main optical path between the saturable optical element and the output of the regenerator. An important component of the regenerator is a resonant optical circuit coupled to the main optical path by the first and second couplers.

One of the couplers is arranged to couple light from the saturable optical element to the resonant optical circuit. The other one of the couplers is arranged to couple light from the resonant optical circuit to the saturable optical element. In addition, one of the couplers is arranged to couple no significant light from the resonant optical circuit to the output of the regenerator. Finally, the main optical path and the resonant optical circuit are arranged so as to introduce a delay from the saturable optical element through the resonant optical circuit and back to the saturable optical element substantially equal to an integer multiple of the symbol interval duration.

In use, optical noise or an optical signal provided by a low-power laser is converted by the resonant circuit into a continuous sequence of resonant optical pulses having an even spacing equal to the delay around the resonant circuit such that the resonant optical pulses are substantially centered within respective symbol intervals.

According to another broad aspect, the regenerator comprises a closed resonant optical circuit having an entry point and an exit point and arranged to introduce a round-trip delay substantially equal to an integer multiple of the symbol interval duration. The entry point of the resonant optical circuit is coupled to the first coupler by an entry fiber and the exit point of the resonant optical circuit is coupled to the second coupler by an exit fiber. In accordance with the invention, the first coupler is arranged to couple light either from the main optical path or from the saturable optical element to the entry fiber and the second coupler is arranged to couple light from the exit fiber to the saturable optical element but to couple no significant light from the exit fiber to the output of the regenerator.

Multiple regenerators according to the above may be provided in parallel for use in WDM systems.

BRIEF DESCRIPTION OF THE DRAWINGS

The preferred embodiment of the present invention will now be described with reference to the following figures, in which.

DETAILED DESCRIPTION OF THE PREFERRED EMBODIMENT

Figure 1:
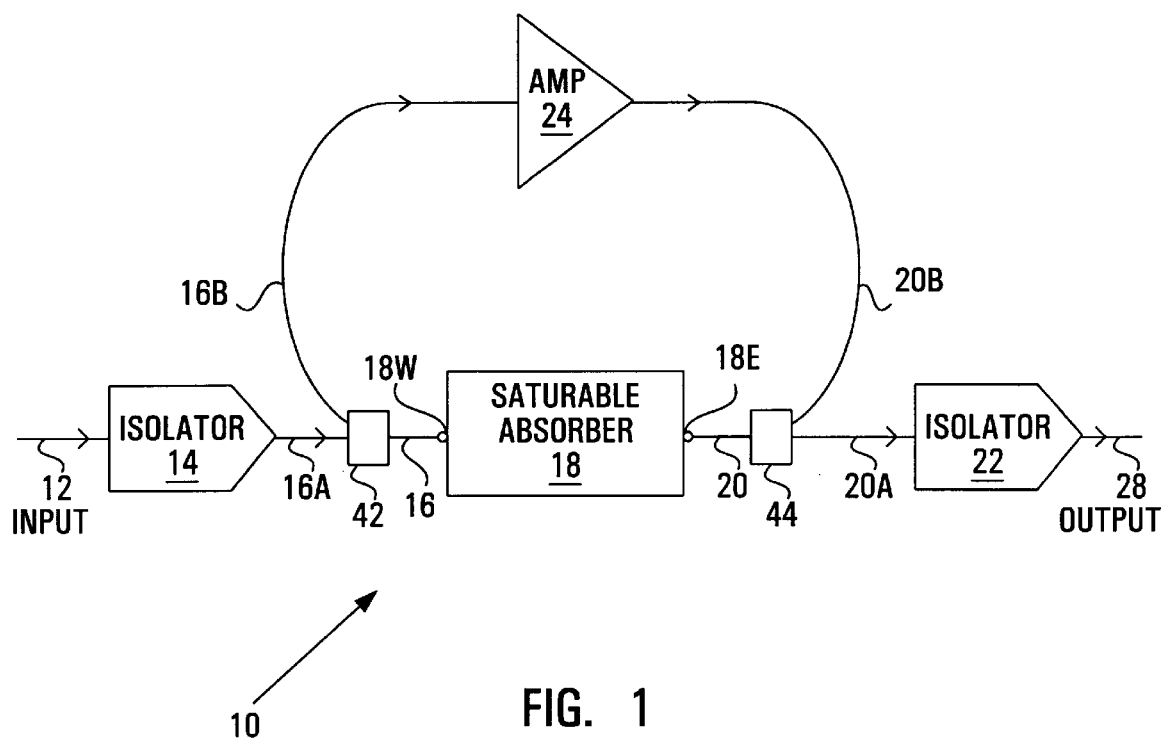
FIG. 1 is a block diagram of a partial soliton regeneration unit in accordance with the preferred embodiment of the present invention.

With reference to FIG. 1, there is shown in block diagram form a partial soliton regeneration unit 10 in accordance with the preferred embodiment of the present invention. The regeneration unit 10 generally comprises an input port for accepting an input optical signal and an output port for transmission of a regenerated optical signal. Two principal components of the regeneration unit 10 are a saturable absorber 18 and a resonant optical circuit directionally coupled to the main optical transmission path so as to allow the counter-propagation of resonant pulses travelling through the resonant circuit.

The saturable absorber 18 is a known bidirectional optical component with two ports, both of which allow the propagation of light through the saturable absorber. A key property of the saturable absorber is that it has a high loss (also called "absorption") when the intensity of the optical signals present at both of its ports is below a characteristic saturation intensity $I^{sat}$ of the medium, while the absorption becomes very low (and "transparency" becomes very high) when the intensity at either port is much larger than $I^{sat}$. A discussion of saturable absorbers can be found on pp. 374–375 of the book by P. W. Milonni and J. H. Eberly, entitled "Lasers", which is incorporated by reference herein.

The saturable absorber 18 has a "west" port 18W connected to an optical fiber 16 which is coupled via a first directional coupler 42 to optical fibers 16A, 16B. Fiber 16A forms part of the main optical path and is connected to the output of an optical isolator 14 which, in FIG. 1, is oriented to permit the flow of light in an "easterly" direction only. Fiber 16B forms part of the resonant optical circuit and is connected to the input of an optical amplifier 24.

Directional coupler 42 is manufactured such that virtually all light arriving on fiber 16A from isolator 14 is coupled to fiber 16, with virtually no light escaping towards fiber 16B. Furthermore, coupler 42 is manufactured such that light arriving in the opposite direction along fiber 16 is at least partly directed into the resonant circuit along fiber 16B. Suitable couplers are known in the art and widely available. It should be understood that if coupler 42 couples virtually no light from fiber 16 to fiber 16A or if the presence of westward-bound light on input fiber 12 is not considered to have deleterious consequences for upstream components, then isolator 14 may be omitted.

The saturable absorber 18 also has an "east" port 18E connected to another optical fiber 20. Fiber 20 is coupled to fibers 20A and 20B via a second directional coupler 44. Fiber 20A is forms part of the main optical transmission path and is connected to another easterly oriented optical isolator 22 which is further connected to an output optical fiber 28. Fiber 20B forms part of the resonant optical circuit and is connected to the output of the optical amplifier 24.

Coupler 44 is manufactured so as to prevent light arriving on fiber 20B from escaping on fiber 20A, while at the same time allowing at least part of that light to be forwarded along fiber 20. At the same time, coupler 44 should be designed to allow most of the light exiting the saturable absorber along fiber 20 to reach fiber 20A. Those skilled in the art will appreciate that isolator 22, which serves to prevent light arriving on the output fiber 28 from reaching coupler 44, is optional since light is not expected to arrive at the partial regeneration unit in this manner.

By selecting, in particular, the lengths and materials for fibers 16, 20, 16B and 20B, it is possible to control the delay of a pulse leaving the west port 18W, travelling around the resonant circuit and returning to the east port 18E. This delay induced by the main optical path and resonant optical circuit should be kept substantially equal to an integer multiple of the symbol interval of the data signal entering appearing on an input optical fiber 12 at the input of the regenerator 10. In the case of soliton pulses, the pulse width of an individual soliton data pulse is usually less than half the symbol interval, and therefore, in an alternative embodiment, the delay introduced by the main optical path and the resonant optical circuit as a pulse travels from the west port to the east port of the saturable absorber may be designed to be substantially equal to one-half the symbol interval.

The optical amplifier 24 is of standard design and may, for instance, be an erbium doped-fiber amplifier. As will be described in further detail later on, the gain of the amplifier 24 is selected as a function of the so-called resonance factor (or "Q") desired of the resonant optical circuit. Implicit in the amplifier 24 is an isolator for allowing light to travel from input to output exclusively. Nevertheless, it is within the scope of the present invention to insert discrete isolators in the resonant optical circuit if the optical amplifier 24 is incapable of providing adequate isolation on its own.

Those skilled in the art will appreciate that the saturable absorber 18 may comprises mirroring elements which may allow placement of the two ports adjacent one another. In this and other cases, it may be more convenient to refer to the East and West ports as first and second ports, etc.

Operation of the preferred embodiment of the invention, shown in FIG. 1, is now described. It is assumed that a random stream of data pulses (ones) and spaces (zeros) enters the isolator 14 on input optical fiber 12. Preferably, the pulses are soliton pulses, although the present invention will still operate advantageously when handling pulses having an arbitrary shape. The data stream can have a bit rate of up to 100 Gbps or more, the only requirement being that the bit rate be known at the time of manufacture or assembly of the partial regeneration unit, so that the delay introduced by the main optical path and the resonant optical circuit may be appropriately selected.

The direction of interest for the flow of light along the main optical path through the regeneration unit 10 is from the input optical fiber 12 to the output optical fiber 28 via isolator 14, fiber 16A, coupler 42, fiber 16, saturable absorber 18, fiber 20, coupler 44, fiber 20A and isolator 22. However, it is to be noted that the properties of the saturable absorber 18 allowed for light to flow in both directions when the intensity of the light at either port 18E or 18W is sufficiently high.

This just described condition is met as soon as the first pulse in the stream of data soliton pulses arriving at the west port 18W reaches an intensity above the saturation intensity $I^{sat}$ and. This first data pulse will saturate the saturable absorber 18, causing its loss to drop and remain low while the intensity of the pulse remains above $I^{sat}$. This "gating" behaviour has two effects: (a) the first data pulse at the west port 18W will be allowed to propagate through the saturable absorber 18 towards the east port 18E, eventually emerging on the output fiber 28; (b) any light present at the east port 18E will counter-propagate through the saturable absorber 18 and emerge at the west port 18W.

In case (b) above, the presence of light at the east port 18E is ensured by the inherent presence of spontaneous optical noise on fiber 20B. Alternatively, instead of relying on the presence of spontaneous optical noise on fiber 20B, a low-power laser could be used as a source of counter-propagating light. In any event, the light present at east port 18E is gated by the saturable absorber 18, resulting in the creation of a weak resonant pulse. The shape of this weak resonant pulse depends on the behaviour of the saturable absorber loss versus input optical energy and therefore is not necessarily a soliton pulse.

The resonant pulse reaches coupler 42, where it is diverted towards fiber 16B in the resonant optical circuit. The resonant pulse enters amplifier 24 and coupler 44, eventually arriving at the east port 18E of the saturable absorber after undergoing the specified delay. Depending on the intensity of the pulse upon its return, it may or may not be readmitted by the saturable absorber 18. In fact, the number of times that a single resonant pulse can travel through the resonant circuit before seeing its intensity drop by a factor of e=2.7172 . . . (known in the art the resonance factor or "Q" of the resonant circuit) is intimately related to the saturation intensity $I^{sat}$ of the saturable absorber 18, the gain of the amplifier 24 and the losses in the fibers 16,16B, 20B,20. Preferably, the resonant optical circuit is designed for a Q of at least 10 and, even more desirably, at least 1000.

The value of Q can therefore be chosen to cause the generation of a continuous sequence of resonant pulses having an even spacing equal to the desired value of the delay around the resonant optical circuit in conjunction with fibers 16 and 20 of the main optical path. In accordance with the invention, this delay is chosen as an integer multiple of the duration of a symbol interval and is preferably substantially equal to the duration of one symbol interval. It will be apparent to those skilled in the art that the evenly-spaced resonant pulses arriving at the saturable absorber are centered about precisely the same position within the symbol interval as was the original data pulse arriving from the opposite direction. It is noted that the resonant pulses spawned by the first data pulse saturate the saturable absorber regardless of whether the random data stream meanwhile presents "ones" or "zeros" to the west port 18W of the saturable absorber 18.

From the point of view of the saturable absorber 18, its loss drops and rises at intervals corresponding to the specified delay around the resonant optical circuit (in addition to fiber segments 16,20 belonging to the main optical path), resulting in periodic dips (or "valleys") if the loss is plotted against time. As will now be described, these dips caused by the resonant pulses contribute to align subsequent data "ones", which may be misaligned due to Gordon-Haus jitter, soliton-soliton interaction or interaction between channels of different wavelengths sharing the same fiber.

Figures 2A, 2B, 2C, 2D:
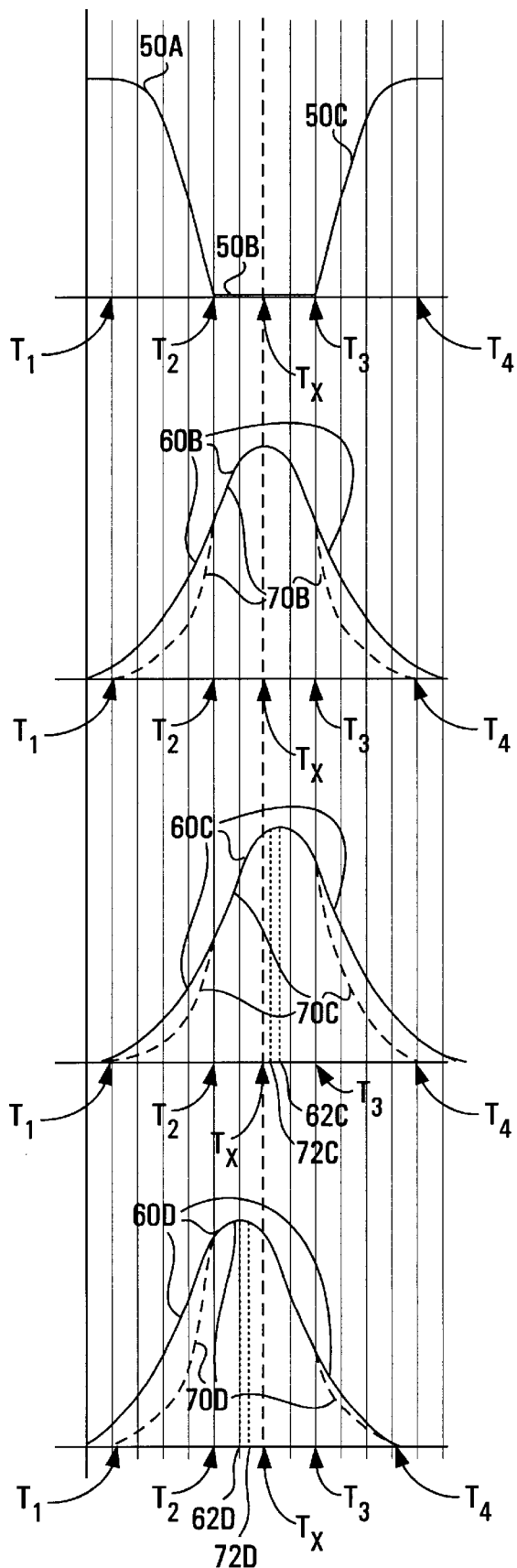
FIG. 2A illustrates the time-varying loss of the saturable absorber used in the regeneration unit of FIG. 1.
FIG. 2B shows the effect of the saturable absorber loss on an input soliton pulse that is perfectly centered within the symbol interval.
FIG. 2C shows the effect of the saturable absorber loss on an input soliton pulse that is late relative to the center of the symbol interval.
FIG. 2D shows the effect of the saturable absorber loss on an input soliton pulse that is early relative to the center of the symbol interval.

In order to show exactly how alignment is achieved by the inventive system, reference is now made to FIG. 2A, which illustrates a typical valley 50 representing the time-varying loss of the saturable absorber 18 resulting from a resonant pulse of sufficient amplitude which has travelled around the resonant circuit and arrives at the east port 18E of the saturable absorber 18 via fiber 20.

The valley 50 consists of three distinct regions 50A, 50B and 50C. Region 50A begins at time $T_1$, ends at time $T_2$ and is characterized by a downwards slope in the loss of the saturable absorber. Region 50B indicates a very low loss in the saturable absorber and lasts until time $T_3$. Region 50C shows an upwards slope in the loss of the saturable absorber starting at time $T_3$ and ending at time $T_4$. If the resonant optical circuit and main optical path are arranged to introduce a delay equal to the duration of one symbol interval, then the center of the valley 50 will be at time $T_x$, half way between times $T_2$ and $T_3$, at the center of the corresponding symbol interval.

During the time when the saturable absorber 18 undergoes a loss having a time varying curve represented by periodic valleys of the type shown in FIG. 2A, data soliton pulses will arrive at the west port 18W via the input optical fiber 12, isolator 14, fiber 16A and fiber 16. FIGS. 2B, 2C and 2D illustrate the effect of the valley 50 on three such "input" data pulses 60B, 60C, 60D arriving at the west port 18W of the saturable absorber 18. In FIG. 2B, the input data pulse 60B is on time with respect to the center of the symbol interval at time $T_x$, while in FIG. 2C, the input data pulse 60C is late and in FIG. 2D, the input data pulse 60D is early.

By virtue of being centered with respect to the symbol interval, the input data pulse 60B in FIG. 2B is symmetrically disposed about time $T_x$. The resulting "output" data pulse 70B consequently appearing at the east port 18E of the saturable absorber 18 will have very little optical energy until time $T_1$ when the loss of the saturable absorber 18 begins to drop, but will quickly catch up to the intensity of the input data pulse 60B by the time the saturable absorber loss drops to a very low value at time $T_2$.

Between times $T_2$ and $T_3$, the output data pulse 70B tracks the input data pulse 60B but, starting at time $T_3$, it begins to be attenuated relative to the input data pulse. At time $T_4$, the loss of the saturable absorber is high and the output data pulse 70B subsequently remains at a very low optical intensity for times greater than $T_4$, regardless of the intensity of the input data pulse 60B.

Although the output data pulse 70B is slightly distorted relative to the input data pulse 60B (between times $T_1$ and $T_2$ and between times $T_3$ and $T_4$), it remains centered about time $T_x$. The properties of the optical fiber medium will compensate for this distortion and will help restore the soliton characteristics of the output data pulse 70B.

In FIG. 2C, the input data pulse 60C arrives late relative to the center of the valley 50. Again, the resultant output data pulse 70C will have a low value until time $T_1$, when it will begin to rise at progressively less inferior rate than that of the input data pulse 60C. By time $T_2$, the output data pulse 70C catches up to the input data pulse 60C. Between time $T_2$ and time $T_3$, the output data pulse 70C matches the input pulse. After time $T_3$, the output data pulse 70C begins to suffer attenuation relative to the input data pulse 60C and drops to a low value at time $T_4$.

It is noted that while center of the input data pulse 60C is at time 62C, the output pulse is mostly concentrated around a time instant 72C which, propitiously, is closer to the center of the valley 50 at time $T_x$. Stated differently, a significant portion of the data input pulse not lying around time $T_x$ has been attenuated with the result that the output data pulse 70C has been pushed more towards the center of the symbol interval, thus mitigating the effects of timing jitter.

Despite the output data pulse 70C being distorted with respect to the input data pulse 60C, the properties of the optical fiber medium can be constructed to compensate for this distortion and help bestow the properties of a soliton upon output data pulse 70C if so desired.

Lastly, FIG. 2D shows the input data pulse 60D arriving early relative to the center of the symbol interval. As before, the loss of the saturable absorber 18 remains high until time $T_1$, at which point the output data pulse 70D begins to rise at a rate which progressively increases until the output data pulse 70D catches up to the input data pulse 60D at time $T_2$. Between times $T_2$ and $T_3$, the output data pulse 70D follows the input data pulse 60D. Between times $T_3$ and $T_4$, the output data pulse 70D drops to a low value faster than does the input data pulse 60D and remains at that value for times greater than $T_4$.

Although the input data pulse 60D is centered at time 62D, which is noticeably early with respect to the center of the symbol interval at time $T_x$, the output data pulse 70D is largely concentrated about time 72D, which is closer to time $T_x$. Thus, once again, timing jitter is mitigated by the inventive regeneration unit and deviations from the ideal soliton shape in the output data pulse 70D are compensated for by the fiber optic propagation medium, consisting of fiber 20, fiber 20A, output optical fiber 28 and subsequent optical fibers.

Figure 3:
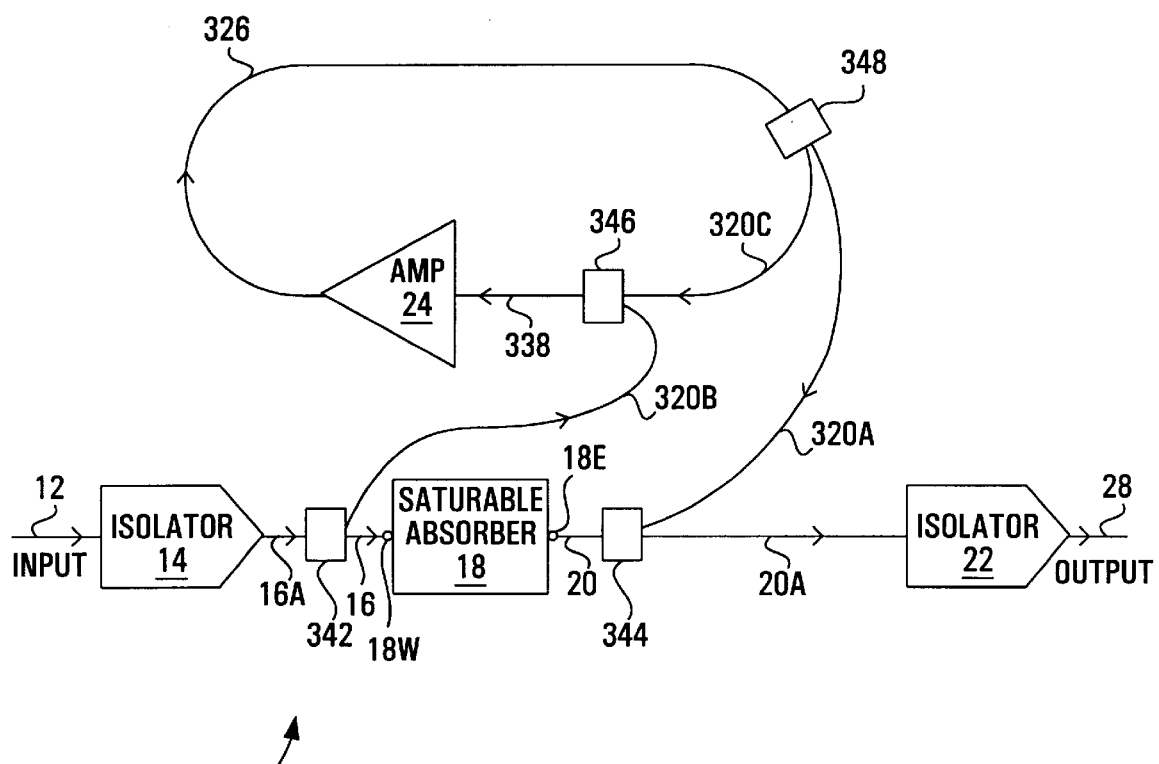
FIG. 3 is a block diagram of an alternative embodiment of the present invention.

An alternative embodiment of the present invention is shown in FIG. 3, wherein a directional coupler 342 is used to route optical signals arriving from isolator 14 along optical fiber 16A partly towards the saturable absorber 18 and partly towards a resonant optical circuit via an optical fiber 320B. At another coupler 344, optical signals exiting the east port 18E of the saturable absorber are routed towards isolator 22 along fiber 20A and light arriving in the opposite direction from the resonant optical circuit on a fiber 320A is routed to the east port of the saturable absorber 18. Coupler 344 is required to achieve good optical isolation between fibers 320A and 20A, so that light arriving on fiber 320A does not escape onto fiber 20A.

Fiber 320B leads to a coupler 346 which provides an entry point for light into the resonant optical circuit. Coupler 346 combines the light present on fiber 320B with the light present on another fiber 320C onto yet another fiber 338, which leads to optical amplifier 24. Amplifier 24 has an output connected via a fiber 326 to another coupler 348, which is connected to fibers 320A and 320C. Coupler 348 provides an exit point for light from the resonant optical circuit by routing part of the light arriving on fiber 326 towards fiber 320A. The remaining light present on fiber 326 is routed by coupler 348 towards fiber 320C, thereby completing the resonant circuit by virtue of the connection to coupler 346.

The resonant optical circuit shown in FIG. 3 is a closed circuit and may be regarded as consisting of coupler 346, fiber 338, amplifier 24, fiber 326, coupler 348 and fiber 320C. In contrast with the resonant optical circuit of FIG. 1, the resonant optical circuit of FIG. 3 is separate from the saturable absorber, being linked thereto at its entry point by fiber 320B and at its exit point by fiber 320A. In addition, there are three delays that can be associated with the resonant optical circuit:

$T_{CKT}$, used to denote the round-trip delay around the resonant circuit, i.e., the delay from any point to that same point around the resonant circuit.

$T_{PRE}$, used to denote the amount of time by which a pulse arriving at the entry point of the resonant optical circuit via fiber 320B is delayed relative to a pulse entering the west port 18W of the saturable absorber.

$T_{POST}$, used to denote the time taken by a pulse leaving the exit point of the resonant circuit via fiber 320A to arrive at the east port 18E of the saturable absorber.

Clearly, $T_{PRE}$ will depend on the length and construction of fibers 320B and 16, while $T_{POST}$ will depend on the length and construction of fibers 320A and 20. It is noted that if fiber 320B is shorter than fiber 16, then $T_{PRE}$ will be negative, as the pulse entering the resonant circuit will precede the pulse entering the saturable absorber. For reasons soon to become evident, the sum of $T_{PRE}$ and $T_{POST}$ is preferably a positive, negative or zero integer multiple of the symbol interval.

In operation, coupler 342 will couple part of the intensity of a first input data pulse arriving via the input optical fiber 12 and isolator 14 towards the west port 18W of the saturable absorber 18 via fiber 16. Coupler 342 also couples part of the intensity of that first pulse to fiber 320B, which leads to the resonant optical circuit. Again, the input data pulses may be soliton pulses, but are not required to be so.

The pulse entering the saturable absorber will presumably have an intensity temporarily above $I^{sat}$, causing the loss of the saturable absorber to drop as previously explained. The data pulse then emerges at the east port 18E and is transferred by coupler 344 to fiber 20A, after which it passes through isolator 22 and emerges as an output data pulse on optical fiber 28.

Meanwhile, the pulse leaving coupler 342 along fiber 320B arrives at the entry point of the resonant optical circuit $T_{PRE}$ seconds after the pulse leaving along fiber 16 enters the west port of the saturable absorber. As already mentioned, a pulse may enter the resonant circuit even before the corresponding pulse reaches the saturable absorber, in which case $T_{PRE}$ would have a negative value. In any event, the pulse entering the resonant circuit is coupled by coupler 346 towards fiber 338 and is amplified by the optical amplifier 24 in accordance with a preselected gain.

The amplified pulse travels along fiber 326 until it reaches coupler 348. At coupler 348, part of the intensity of the first pulse to enter the resonant circuit is transferred to fiber 320C, which then reaches the amplifier 24 via coupler 346 and fiber 338, completing the resonance loop. This pulse will continue to resonate at intervals equal to $T_{CKT}$, which has been designed to be substantially equal to an integer multiple of the symbol interval and is preferably substantially equal to the duration of a single symbol interval. The number of times that the resonant pulse travels around the resonant circuit before a significant portion of its intensity is determined by the Q of the resonant circuit, which depends on the losses through the various couplers and fiber links and also on the amplifier gain.

Coupler 348 also corresponds to the exit point for the resonant circuit and therefore part of the intensity of the first resonant pulse is transferred to fiber 320A. The pulse exiting the resonant optical circuit then takes $T_{POST}$ seconds to reach the east port 18E of the saturable absorber 18 via fiber 320A, coupler 44 and fiber 20. As previously discussed, a strong enough pulse will saturate the saturable absorber.

Saturation of the saturable absorber is desirably achieved at the center of each symbol interval and therefore it is important to consider the role of the delays $T_{CKT}$, $T_{PRE}$ and $T_{POST}$. Firstly, it is noted that the amount of time taken by this first resonant pulse to reach the east port of the saturable absorber relative to the first data pulse arriving at the west port thereof equals $T_{PRE}+T_{POST}+T_{CKT}$.

Now, it is recalled that $T_{CKT}$ is an integer multiple of the symbol interval and $T_{PRE}$ and $T_{POST}$ also sum to an integer multiple of the symbol interval. Therefore, the first resonant pulse arriving at the east port 18E of the saturable absorber will be centered within the symbol interval of the next data pulse arriving at the west port 18W. As discussed in relation to FIG. 2, this advantageously results in realignment of data pulses that might be early or late with respect to the center of the symbol interval. If the input data pulses are soliton pulses, then the centered output pulses may be distorted so as to temporarily lose their soliton characteristics, which are then restored by propagation along fibers 20, 20A and 28.

It is to be noted that in the partial regeneration unit of FIG. 3, a first resonant pulse can be created by an input data pulse which does not necessarily saturate the saturable absorber. This is in contrast to the regeneration unit of FIG. 1, which creates a first resonant pulse only subject to saturation of the saturable absorber.

In another alternative embodiment of the invention, the functionality provided by coupler 342 in FIG. 3 can be performed by coupler 344. That is to say, coupler 344 may be connected via fiber 320B to coupler 346 in the resonant optical circuit, in addition to being connected to coupler 348 via fiber 320A. In this case, the first pulse entering the resonant optical circuit would necessarily follow the first input data pulse entering the saturable absorber, and hence $T_{PRE}$ would be positive. Notwithstanding the sign of $T_{PRE}$, if $T_{CKT}$ as well as the sum of $T_{PRE}$ and $T_{POST}$ are substantially equal to an integer multiple of the symbol interval, the invention will continue to provide alignment of misaligned data pulses.

It is noted that in this just described alternative embodiment of the partial regeneration unit of FIG. 3, a first resonant pulse can only be created by an input data pulse which saturates the saturable absorber.

Another variation of the present invention involves the use of wavelength splitting devices, polarization splitting devices or propagation mode converters instead of directional couplers. By way of example, FIG. 4 shows a partial optical regeneration unit 410 in which the input optical fiber 12 and fiber 16B are coupled to fiber 16 through a polarization combiner, wavelength combiner or mode converter 442 and wherein the output optical fiber 28 and fiber 20B are coupled to fiber 20 through a polarization splitter, wavelength splitter or mode converter 444.

The resonant circuit carries resonant pulses in the counter-clockwise direction and the optical amplifier 424 is preferably oriented accordingly. Nevertheless, it is to be appreciated that functionality of the invention is not impaired by the amplifier 424 being oriented as in FIG. 1. Such a configuration would simply result in twice decoupling the resonant circuit from the main optical path, once in terms of direction and again in terms of polarization, wavelength or mode of propagation. It is also noted that little additional benefit would be provided by inserting isolators in the main optical path when the amplifier 424 is oriented as shown in FIG. 4 since light always travels through the saturable absorber 18 in an easterly direction.

Figure 4:
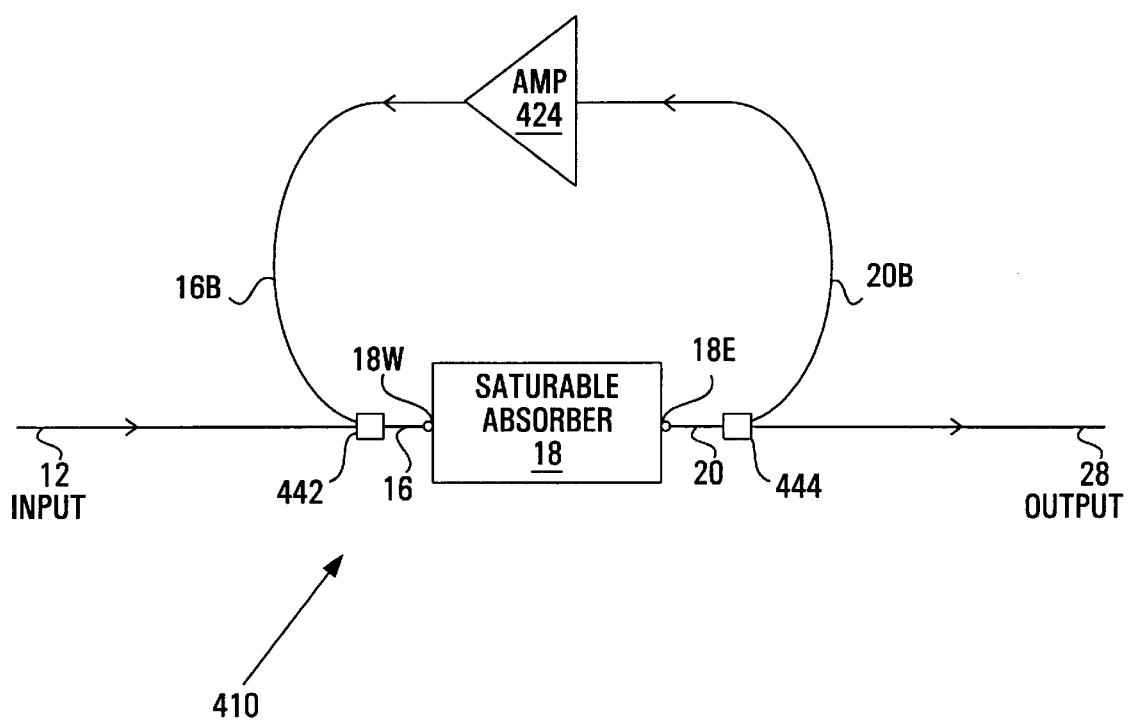
FIG. 4 is a block diagram of another alternative embodiment of the present invention.

In the embodiment of FIG. 4, the components and parameters of the main optical path and the resonant optical circuit are chosen so that a pulse travelling from the east port 18E around the resonant optical circuit to the west port 18W undergoes a delay substantially equal to the symbol interval of the data pulses arriving at the partial regeneration unit via the input optical fiber 12.

In operation, optical data pulses present on the input optical fiber 12 are assumed to arrive from an upstream network element. As a first pulse on the input optical fiber 12 arrives at the polarization combiner, wavelength combiner or mode converter 442, it is combined with light that is present on fiber 16B, which can originate from very weak spontaneous amplifier emissions or from a low-power laser. Importantly, the light on fiber 16B has a different polarization, wavelength or propagation mode than the light on fiber 12 and both optical signals preserve their respective polarizations, wavelengths or modes as they exit the combiner 442 and travel along fiber 16, eventually reaching the west port 18W of the saturable absorber 18.

The saturable absorber operates as previously described, i.e., input pulses of sufficient intensity which present themselves at the west port 18W will appear as output pulses at the east port 18E and will travel along fiber 20. In the case of the first input data pulse appearing at the west port 18W, the saturable absorber loss will drop for the duration of that pulse, allowing it to pass through to the east port 18E but also allowing light having other polarizations, wavelengths or modes to pass through as well. This results in the superposition of two pulses, namely an output data pulse and a newly generated resonant pulse, which emerge from the east port 18E and simultaneously arrive at the wavelength splitter 444 (which may alternatively be a polarization splitter or a mode converter).

As a result of interaction with the polarization or wavelength splitter or mode converter 444, the output data pulse preserves its original polarization, wavelength or mode and continues onward along the output optical fiber 28, while the resonant pulse (which is weak and has a different polarization, wavelength or propagation mode) travels along fiber 20B towards the optical amplifier 424.

After amplification by the amplifier 424, the resonant pulse, now stronger, travels along fiber 16B until it reaches the polarization or wavelength combiner (or mode converter) 442. Here, the resonant pulse is combined with a new data pulse (or space) arriving on the input optical fiber 12 and the combined optical signal is fed to the saturable absorber 18 via fiber 16. Regardless of whether the new incoming binary symbol is a "zero" (pulse) or a "one" (space), the presence of an amplified resonant pulse of sufficient intensity at the west port 18W will cause the saturable absorber loss to drop. Resonant pulses are then continuously generated in the absence of a new input data pulse for a number of times that depends on the Q of the circuit, which is controllable by choosing suitable values for the amplifier gain and a suitable length and material for each of fibers 20, 20B, 16B and 16.

A further variation of the invention involves use of a component having different intensity-dependent behaviour than a saturable absorber, e.g., a semiconductor optical amplifier (SOA). A SOA typically has west and east ports and is known to have a gain that is relatively large and constant for small input optical intensities but much lower when the input optical intensity is high. In other words, the SOA saturates when the input optical intensity at either the east port or the west port (or both) is above a known threshold intensity.

A partial regeneration unit employing a SOA would be similar to that shown in FIG. 3, with the SOA replacing the saturable absorber. The previous definitions of $T_{CKT}$, $T_{PRE}$ and $T_{POST}$ still apply but for reasons soon to become apparent, the sum of $T_{PRE}$ and $T_{POST}$ should be substantially equal to an odd integer multiple of half the symbol interval, for instance, 0.5 or 1.5 times the duration of a symbol interval.

Again, coupler 344 routes a first input data pulse partly onto fiber 320B and partly onto fiber 16. The input data pulse reaches the west port SOA, where it is passed through if its intensity is below the threshold intensity of the SOA. Meanwhile, a resonant pulse begins to travel through the resonant optical circuit in a manner similar to that already described with reference to FIG. 3. However, the gain of the amplifier 24 is set to produce a resonant pulse of much greater intensity than the threshold intensity of the SOA.

The very strong resonant pulse exits the resonant circuit via fiber 320A and is coupled onto fiber 20 by coupler 344. In accordance with the properties inherent to the SOA, its gain will remain relatively high until the very strong resonant pulse arrives, at which point the SOA gain will be significantly reduced. Naturally, it is undesirable to reduce the SOA gain during an input data pulse. In contrast, it is beneficial to reduce the SOA gain between input data pulses. Therefore, it is desirable that the center of a resonant pulse be half-way between the center of the symbol intervals. In other words, $T_{PRE}+T_{POST}$ should provide a net relative delay of ½ or 3⁄2 (etc.) times the duration of a symbol interval.

Consequently, skew data pulses arriving at the west port of the SOA will exit the east port of the SOA 318 with an optical intensity more attenuated at the extremes of each symbol interval, from which it follows that the effects of timing jitter are once again mitigated. Any distortion in the shape of the newly centered symbol with respect to an ideal soliton shape can be compensated for by propagation along appropriately designed fibers 20, 20A and 28.

In an alternative embodiment of the just described partial regeneration unit employing a SOA, an optical band pass filter may be inserted in the resonant optical circuit between the output of the amplifier 24 and coupler 348. If such a filter is employed, then the resonant pulses will be broad, leaving only a short period of time during which the gain of the SOA will be significant, allowing for even more precise centering of the output data pulses.

In another alternative embodiment of the invention utilizing a SOA, the functionality provided by coupler 342 can be performed by coupler 344. That is to say, coupler 344 may be connected via fiber 320B to coupler 346 in the resonant optical circuit, in addition to being connected to coupler 348 via fiber 320A. In this case, the first pulse entering the resonant optical circuit would necessarily follow the first input data pulse entering the saturable absorber, and hence $T_{PRE}$ would be positive. Notwithstanding the sign of $T_{PRE}$, if $T_{CKT}$ is substantially equal to an integer multiple of the symbol interval duration and if the sum of $T_{PRE}$ and $T_{POST}$ is substantially equal to an odd integer multiple of half the symbol interval duration, the invention will continue to provide alignment of misaligned data pulses.

It should be understood that the present invention also extends to multi-wavelength systems in which distinct wavelengths of light carry respective data streams. A regeneration unit for use in such systems comprises a parallel arrangement of a plurality of partial regeneration units between an optical demultiplexer and optical multiplexer. Each individual partial regeneration unit is assigned a specific wavelength of light. In one embodiment, the components of each partial regeneration unit could function at the respective assigned wavelength. Alternatively, each component in a particular regeneration unit could be provided with sufficient bandwidth to operate at any wavelength.

It is to be understood that further modifications, including the use of other saturable optical elements than those specifically described, can be made while remaining within the scope of the invention, which is only to be limited by the appended claims.

We claim:

1. A regenerator for correcting timing jitter of a stream of data pulses, comprising:
   a saturable absorber, for presenting a region of low loss to optical signals of an intensity higher than a threshold and absorbing optical signals of an intensity lower than the threshold; and
   a resonant optical circuit coupled to the saturable absorber in such a way that jittered data pulses passing through the saturable absorber induce resonant pulses within the resonant optical circuit;
   wherein the resonant pulses cause the saturable absorber to exhibit low loss at periodic intervals, thereby to provide retiming of the jittered data pulses;
   wherein light from the resonant pulses is decoupled from the re-timed data pulses.

2. A regenerator as claimed in claim 1, wherein the data pulses are soliton pulses.

3. A regenerator as claimed in claim 1, further comprising:
   a first optical isolator connected to a first port of the saturable absorber, for preventing optical signals exiting the saturable absorber from counter-propagating with respect to the jittered data pulses; and
   a second optical isolator connected to a second port of the saturable absorber, for preventing optical signals counter-propagating with respect to the re-timed optical pulses from entering the saturable absorber.

4. A regenerator as claimed in claim 1, wherein the resonant optical circuit comprises:

an optical amplifier;

an input fiber of a first length connected between the first port of the saturable absorber and an input of the optical amplifier; and an output fiber of a second length connected between an output of the optical amplifier and the second port of the saturable absorber.

5. A regenerator as claimed in claim 4, wherein the resonant pulses propagate through the saturable absorber in a direction opposite that of the jittered data pulses.

6. A regenerator as claimed in claim 4, wherein the resonant pulses propagate through the saturable absorber in the same direction as that of the jittered data pulses.

7. A regenerator as claimed in claim 4, wherein the first and second lengths are selected to obtain the resonant rate equal to the rate of the data pulses.

8. A regenerator as claimed in claim 4, wherein the first and second lengths are selected to obtain the resonant rate equal to an integer multiple of the rate of the data pulses.

9. A system for regenerating an input wavelength-division multiplexed (WDM) optical signal consisting of a plurality of optical channels each occupying a respective wavelength and carrying a respective individual input optical signal defining data symbols occupying respective symbol intervals of a common duration, the system comprising:

an optical demultiplexer for demultiplexing the input WDM optical signal into the input optical signals;

an optical multiplexer for combining a plurality of output optical signals into an output WDM optical signal; and for each wavelength, a plurality of regeneration units as claimed in claim 1 connected between the optical demultiplexer and the optical multiplexer, for receiving a respective one of the input optical signals and for transmission of a respective one of the individual optical output signals.

10. A method of re-timing a stream of jittered data pulses, comprising the steps of:

providing in the optical path a saturable absorber for admitting optical signals of an intensity higher than a threshold and absorbing optical signals of an intensity lower than the threshold;

inducing resonant pulses in a resonant optical circuit coupled to the saturable absorber, the resonant pulses causing the saturable absorber to exhibit low loss at periodic intervals;

adjusting the rate of said intervals to be a multiple of the rate of said pulses; and passing said pulses through said absorber for re-timing and re-shaping;

wherein light from the resonant pulses is decoupled from the re-timed data pulses.

11. A regenerator for regenerating an input optical signal defining data symbols occupying respective symbol intervals of a common duration, comprising:

an input for receiving the input optical signal;

an output for transmission of a regenerated optical signal;

a main optical path connected between the input and output of the regenerator;

a saturable optical element connected in the main optical path;

a first coupler connected in the main optical path between the input of the regenerator and the saturable optical element;

a second coupler connected in the main optical path between the saturable optical element and the output of the regenerator; and a resonant optical circuit coupled to the main optical path by the first and second couplers;

wherein one of the couplers is arranged to couple light from the saturable optical element to the resonant optical circuit, wherein the other one of the couplers is arranged to couple light from the resonant optical circuit to the saturable optical element and wherein one of the couplers is arranged to couple no significant light from the resonant optical circuit to the output of the regenerator; and wherein the main optical path and the resonant optical circuit are arranged to introduce a delay from the saturable optical element through the resonant optical circuit and back to the saturable optical element substantially equal to an integer multiple of the symbol interval duration.

12. A regenerator according to claim 11, wherein the saturable optical element is a saturable absorber.

13. A regenerator according to claim 11, wherein the first and second couplers are directional couplers arranged so that the input optical signal and light exiting the resonant optical circuit propagate through the saturable optical element in opposite directions.

14. A regenerator according to claim 11, wherein the first and second couplers are directional couplers arranged so that the input optical signal and light exiting the resonant optical circuit propagate through the saturable optical element in the same direction.

15. A regenerator according to claim 11, wherein the first coupler is a polarization splitter and wherein the second coupler is a polarization combiner, the first and second couplers being arranged so that the input optical signal and light exiting the optical resonant circuit propagate through the saturable optical element at different polarizations.

16. A regenerator according to claim 11, wherein the first coupler is a wavelength splitter and wherein the second coupler is a wavelength combiner, the first and second couplers being arranged so that the input optical signal and light exiting the optical resonant circuit propagate through the saturable optical element at different wavelengths.

17. A regenerator according to claim 11, wherein the first and second couplers are mode converters, the first and second couplers being arranged so that the input optical signal and light exiting the optical resonant circuit propagate through the saturable optical element in different propagation modes.

18. A regenerator according to claim 11, wherein the resonant optical circuit comprises an optical amplifier.

19. A regenerator according to claim 18, wherein the resonant optical circuit comprises an optical isolator connected to an input of the optical amplifier.

20. A regenerator according to claim 18, wherein the resonant circuit comprises an optical isolator connected to an output of the optical amplifier.

21. A regenerator according to claim 11, further comprising an optical isolator connected in the main optical path between the input of the regenerator and the first coupler, for preventing the flow of light from the first coupler to the input of the regenerator.

22. A regenerator according to claim 11, further comprising an output optical isolator connected to the input port, for allowing the flow of light from the output port the output optical isolator.

23. A regenerator according to claim 11, wherein the input optical signal consists of soliton pulses.

24. A regenerator according to claim 11, wherein said delay is equal to the duration of one symbol interval, such that a resonant pulse is generated at every symbol interval and is coincident with pulses in the input optical signal.

25. A system for regenerating an input wavelength-division multiplexed (WDM) optical signal consisting of a plurality of optical channels each occupying a respective wavelength and carrying a respective individual input optical signal defining data symbols occupying respective symbol intervals of a common duration, the system comprising:

an optical demultiplexer for demultiplexing the input WDM optical signal into the input optical signals;

an optical multiplexer for combining a plurality of output optical signals into an output WDM optical signal; and for each wavelength, a plurality of regeneration units as claimed in claim 15 connected between the optical demultiplexer and the optical multiplexer, for receiving a respective one of the input optical signals and for transmission of a respective one of the individual optical output signals.

26. A regenerator for regenerating an input optical signal defining data symbols occupying respective symbol intervals of a common duration, comprising:

an input for receiving the input optical signal;

an output for transmission of a regenerated optical signal;

a main optical path connected between the input and output of the regenerator;

a saturable optical element connected in the main optical path;

a first coupler connected in the main optical path between the input of the regenerator and the saturable optical element;

a second coupler connected in the main optical path between the saturable optical element and the output of the regenerator; and a closed resonant optical circuit having an entry point and an exit point and arranged to introduce a round-trip delay $T_{CKT}$ substantially equal to an integer multiple of the symbol interval duration;

an entry fiber coupled to the entry point of the resonant optical circuit and to the first coupler;

an exit fiber coupled to the exit point of the resonant optical circuit and to the second coupler;

wherein the first coupler is arranged to couple light from the main optical path to the entry fiber; and wherein the second coupler is arranged to couple light from the exit fiber to the saturable optical element but to couple no significant light from the exit fiber to the output of the regenerator.

27. A regenerator according to claim 26, the input optical signal leaving the first coupler arrives at the entry point of the resonant optical circuit $T_{PRE}$ seconds after if arrives at the saturable optical element, wherein a resonant optical signal leaving the exit point of the resonant optical circuit arrives at the saturable optical element after $T_{POST}$ seconds, and wherein the sum of $T_{PRE}$ and $T_{POST}$ is substantially equal to a positive, negative or zero integer multiple of the symbol interval duration.

28. A regenerator according to claim 27, wherein the saturable optical element is a saturable absorber.

29. A regenerator according to claim 26, the input optical signal leaving the first coupler arrives at the entry point of the resonant optical circuit $T_{PRE}$ seconds after if arrives at the saturable optical element, wherein a resonant optical signal leaving the exit point of the resonant optical circuit arrives at the saturable optical element after $T_{POST}$ seconds, and wherein the sum of $T_{PRE}$ and $T_{POST}$ is substantially equal to a positive or negative odd integer multiple of half the symbol interval duration.

30. A regenerator according to claim 29, wherein the saturable optical element is a semiconductor optical amplifier.

31. A regenerator according to claim 26, wherein the first and second couplers are directional couplers arranged so that the input optical signal and light leaving the exit fiber propagate through the saturable optical element in opposite directions.

32. A regenerator according to claim 26, wherein the resonant optical circuit comprises:

an optical amplifier; and an arrangement of couplers for coupling an output of the optical amplifier to the exit fiber and to an input of the amplifier and for coupling the entry fiber to the input of the amplifier.

33. A regenerator according to claim 32, wherein the resonant optical circuit further comprises an optical filter connected to the output of the optical amplifier.

34. A regenerator according to claim 26, wherein $T_{CKT}$ is equal to the duration of one symbol interval, such that a resonant pulse is generated at every symbol interval.

35. A regenerator for regenerating an input optical signal defining data symbols occupying respective symbol intervals of a common duration, comprising:

an input for receiving the input optical signal;

an output for transmission of a regenerated optical signal;

a main optical path connected between the input and output of the regenerator;

a saturable optical element connected in the main optical path;

at least one coupler connected in the main optical path;

a closed resonant optical circuit having an entry point and an exit point and arranged to introduce a round-trip delay substantially equal to an integer multiple of the symbol interval duration;

an entry fiber coupled to the entry point of the resonant optical circuit and one of the at least one coupler;

an exit fiber coupled to the exit point of the resonant optical circuit and one of the at least one coupler;

wherein the at least one coupler is arranged to couple light from the saturable optical element to the entry fiber, to couple light from the exit fiber to the saturable optical element but to couple no significant light from the exit fiber to the output of the regenerator.

* * * * *